United States Patent [19]

Kolarik et al.

[11] Patent Number: 4,659,551
[45] Date of Patent: Apr. 21, 1987

[54] PROCESS FOR SEPARATION OF NEPTUNIUM FROM AN ORGANIC PHASE IN THE RECOVERY OF IRRADIATED FUEL AND/OR FERTILE MATERIALS

[75] Inventors: Zdenek Kolarik, Karlsruhe; Robert Schuler, Germersheim, both of Fed. Rep. of Germany

[73] Assignee: Kernforschungszentrum Karlsruhe GmbH, Karlsruhe, Fed. Rep. of Germany

[21] Appl. No.: 649,009

[22] Filed: Sep. 10, 1984

[30] Foreign Application Priority Data

Sep. 13, 1983 [DE] Fed. Rep. of Germany ....... 3332954

[51] Int. Cl.$^4$ ........................................... C01G 56/00
[52] U.S. Cl. ......................................... 423/10; 423/8; 423/250
[58] Field of Search ............................ 423/10, 250, 8

[56] References Cited

U.S. PATENT DOCUMENTS

| | | | |
|---|---|---|---|
| 2,847,276 | 8/1958 | Butler | 423/10 |
| 3,962,401 | 6/1976 | Tsuboya et al. | 423/250 |
| 4,080,273 | 3/1978 | DePoorter et al. | 423/10 |
| 4,229,421 | 10/1980 | Chapman et al. | 423/250 |
| 4,278,559 | 7/1981 | Levenson et al. | 423/10 |
| 4,337,225 | 6/1982 | Dines | 423/10 |

OTHER PUBLICATIONS

KFK 2558, "Experience with the Reprocessing of LWR, Pu Recycle, and FBR Fuel in the MILLI Facility", W. Oschsenfeld et al., Sep. 1977.
"NP$^{237}$ and PU$^{238}$ Separation at the Savannah River Plant", W. L. Poe et al., *I&EC Process Design and Development*, vol. 3, No. 4, pp. 314 to 322.

*Primary Examiner*—Edward A. Miller
*Attorney, Agent, or Firm*—Sughrue, Mion, Zinn, Macpeak & Seas

[57] ABSTRACT

A process for the separation of neptunium from an organic phase, which is developed in the recovery of irradiated nuclear fuel and/or fertile material. The organic phase contains uranium-, plutonium- and neptunium ions, tritium in the form of tritiated water and fission products in ionic form, as well as an organic extraction agent dissolved in diluent. After a first wash step, and before the organic phase is further fed to a uranium-plutonium separation or to a uranium-plutonium coreextraction, the organic phase is brought into contact with an aqueous solution containing diluted HNO$_3$, butyraldehyde and a low concentration of sulfamic acid in countercurrent flow as a second wash step for the selective reduction of Np (VI) to Np (V) and for selective stripping of Np (V), with respect to U and Pu, from the organic into an aqueous phase. The resulting aqueous phase charged with Np (V) and with portions of tritium and fission products is brought into contact with a solution of fresh extraction agent solution having a flow which corresponds to from 1/13.3 to 1/3.3 of the flow of the organic phase coming from the first wash step and to be decontaminated, to assure the selectivity of the stripping of Np (V) in reference to U and Pu. The aqueous phase resulting from this step and containing Np (V), T and fission products is then separated from the solution of fresh extraction agent.

16 Claims, 2 Drawing Figures

Flow chart for the process according to the invention of coextraction from uranium and plutonium and the wash of the charged organic phase with separation from neptunium Conventional flow chart of coextraction from uranium and plutonium and the wash of the charged organic phase without separation from neptunium Flow chart for the process according to the invention of coextraction from uranium and plutonium and the wash of the charged organic phase with separation from neptunium

PROCESS FOR SEPARATION OF NEPTUNIUM FROM AN ORGANIC PHASE IN THE RECOVERY OF IRRADIATED FUEL AND/OR FERTILE MATERIALS

BACKGROUND OF THE INVENTION

The present invention relates to a process for the separation of neptunium out of an organic phase, which is developed in the recovery of irradiated nuclear fuel and/or fertile material. In the recovery process, irradiated nuclear fuel and/or fertile material is dissolved in an aqueous, strong acid to form an aqueous phase or starting solution (feed solution) containing uranium-, plutonium- and neptunium ions, as well as /tritium in form of tritiated water and of fission products in ionic form. The uranium, plutonium and neptunion ions, as well as portions of the tritium in form of tritiated water and fission products in ionic form are then transferred from the aqueous phase into an organic phase comprised of an organic extraction agent dissolved in a diluent. This transfer of uranium and plutonium to the organic phase is known as coextraction. The organic phase is then subjected to a first wash step and a second wash step, with each wash step being a decontamination step, respectively, with respect to fission products.

Spent nuclear fuels, for example from Light Water Nuclear Reactors (LWR fuels), are recovered with the Purex process with the goal of recovering the valuable fissionable materials which are contained in them, namely, uranium and plutonium. The chemical and radio-chemical purity of the recovered uranium and plutonium end products must satisfy very high specifications. One of the radioactive impurities which must be removed from the uranium product with high efficiency is neptunium.

In LWR fuels, neptunium is developed mainly in the reaction chain $^{238}U(n,2n)$ $^{237}U(\beta)$ $^{237}Np$. A burn-up spent fuel contains several hundred mg of Np per kg, but after the recovery, the uranium and plutonium products can be contaminated with at most $\leq 1$ ppm or $\leq 1000$ ppm of neptunium, respectively, to meet the very high specifications that have been set. That means for neptunium, during the entire process, decontamination factors of $\geq 500$ or $\geq 50$, respectively, must be attained in the uranium and plutonium purification.

The effective separation of neptunium from uranium and plutonium is above all made more difficult by the fact that neptunium can be present in different process solutions in two or even three coexisting valence states which differ greatly in their extractability, with the usual organic extraction agents such as, for example, with tributylphosphate (TBP) as extractant. Thus, neptunium (V) is practically not extractable with TBP, neptunium (IV) is quite weakly extractable with TBP, and neptunium (VI) has an extractability with TBP comparable with that of plutonium (IV). In many extraction operations of the Purex process, neptunium tends to be divided more or less evenly between the raffinate and the extract.

In the case when no attempt is made to influence the extractability of neptunium, a large portion of neptunium (to 99%) is extracted with the two elements in the first extraction operation of the Purex process, that is, in the coextraction of uranium and plutonium from the aqueous fertile material starting solution into the organic phase. See, W. Oschenfeld, F. Baumgartner, U. Bauder, H.-J. Bleyl, D. Ertel and G. Koch, "Experience with the Reprocessing of LWR, Pu Recycle, and FBR Fuel in the MILLI Facility", KfK 2558 (1977), Report of Kernforschungszentrum Karlsruhe GmbH. In the next step of the Purex process, that is, in the separation of plutonium from uranium, neptunium is divided into two comparable portions, which in each case accompany the uranium and the plutonium product. It would indeed be possible to shift the division of neptunium between these two products to the advantage of the uranium or plutonium product, but in order to do that, the concentration of nitric acid in the organic stream containing uranium and plutonium must be exactly controlled. However, in practice this is not always possible, and it must then be taken into consideration that the uranium product, as well as the plutonium product, is contaminated with neptunium and that the separation of neptunium occurs first in the following purification cycles for uranium and plutonium. There is then a decontamination factor of 200 to 300 or 20 to 30, respectively, to be attained.

It is also obvious that the problem would be most neatly solved if the neptunium were already separated from uranium and plutonium at the beginning of the extraction section of the Purex process. That is, the problem could be neatly solved if neptunium could be successfully sent into the raffinate stream during the coextraction of uranium and plutonium and the subsequent washes of the organic product. Neptunium is present in the starting solution (fuel solution) for the coextraction predominantly in the hexavalent form. A reduction agent must be found that reduces the extractable neptunium (VI) to nonextractable neptunium (V), but that does not also reduce the extractable plutonium (IV) to non-extractable plutonium (III). It is also important that neptunium (V) is not further reduced to partially extractable neptunium (IV). The fulfillment of all of these conditions is most difficult, because a rather high concentration of nitric acid (3 to 4.2 mole/liter) is employed in the aqueous phase in the coextraction of uranium and plutonium. The high acid concentration slows the reduction of neptunium (VI) to neptunium (V), and promotes not only a further reduction of neptunium to neptunium (IV), but also a disproportionation of neptunium (V) to neptunium (IV) and neptunium (VI). The resultant neptunium (IV) can then reduce plutonium (IV) to plutonium (III).

In the literature, only one possibility is described for neptunium to be transferred into the raffinate already during the coextraction of uranium and plutonium. See, W. L. Poe, A. W. Joyce and R. I. Martens, *Ind. Eng. Chem., Process Des. Dev.*, Volume 3, 314+ (1964). The reduction agent used there, nitrite, indeed prevents the development of neptunium (IV) and plutonium (III), but it does not permit very effective separation of neptunium. In the Poe et al publication, no numerical data are to be found, but it can be understood from the text, and applicants' own experiences confirm, that a not inconsiderable portion of the neptunium is extracted with uranium and plutonium in the first extraction cycle and reaches the purification cycle. Thus, Poe et al indicate that neptunium escapes from the mixer-settler employed in the first extraction cycle when uranium and plutonium are coextracted into the organic phase, and that this escaped neptunium turns up in the second uranium cycle waste.

SUMMARY OF THE INVENTION

A primary object of the present invention is to provide a process for separating extracted, undesired neptunium at the beginning of a recovery process, from an organic extraction medium solution used in a process for recovery of irradiated fuel elements and/or fertile elements, the neptunium being present in the organic extraction solution along with the desired fuels uranium and plutonium which have also been extracted. By the means, end product solutions can be obtained, on the one hand containing uranium and on the other hand plutonium, decontaminated insofar as possible with neptunium.

Another object of the present invention is to provide a process in which the neptunium is to be selectively transferred from the organic phase of the coextraction of uranium and plutonium into an aqueous waste solution, without uranium or plutonium reaching the aqueous waste solution.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for separating neptunium from an organic phase, which is developed in the recovery of irradiated nuclear fuel and/or fertile material, the organic phase being developed by dissolving the irradiated nuclear fuel and/or fertile material in an aqueous, strong acid to form an aqueous phase containing uranium-, plutonium- and neptunium ions, as well as tritium in form of tritiated water and of fission products in ionic form, and then transferring the uranium-, plutonium- and neptunium ions, as well as portions of the tritium in form of tritiated water and fission products in ionic form from the aqueous phase into an organic phase comprised of an organic extraction agent dissolved in a diluent, the organic phase then being subjected to a first wash step and a second wash step, the wash steps being decontamination steps, respectively, with respect to fission products, comprising treating the organic phase, charged predominantly with uranium (VI), plutonium (IV) and neptunium (VI), before the organic phase is further fed to a uranium-plutonium separation or to a uranium-plutonium coreextraction, by:

(a) bringing the organic phase, after the first wash step, into contact with an aqueous reduction and stripping solution containing diluted $HNO_3$ being free of tritiated water butyraldehyde and a low concentration of sulfamic acid in countercurrent flow as the second wash step for selectively reducing Np (VI) to Np (V) and selectively stripping Np (V), with respect to U and Pu, from the organic phase into an aqueous phase;

(b) bringing the aqueous phase obtained in step (a) which is charged with Np (V) and with portions of tritium and fission products, into contact with a solution of fresh extraction agent solution having a flow which corresponds to from 1/13.3 to 1/3.3 of the flow of the organic phase coming out from the first wash step and to be decontaminated, to assure the selectivity of the stripping of Np (V) with respect to U and Pu; and (c) separating the aqueous phase resulting from step (b) containing Np (V), tritium and fission products from the solution of fresh extraction agent employed in step (b), and staying uncoupled from the first wash.

The aqueous reduction and stripping solution employed in step (b) preferably has a concentration of butyraldehyde of 0.2 to 0.3 mole/liter, a concentration of sulfamic acid of 0.002 to 0.006 mole/liter and a $HNO_3$ concentration of 0.5 to 1.2 mole/liter.

In a preferred embodiment of the process according to the present invention, the relative flows, respectively, of the organic solution coming out from the first wash step and being charged with U (VI), Pu (IV) and Np (VI), to the aqueous reduction and stripping solution containing butyraldehyde to the fresh organic extracting-agent solution employed in step b) amounts to 1.0:0.11 to 0.275:0.075 to 0.3.

It is to be understood that both the foregoing general description and the following detailed description are exemplary and explanatory, but are not restrictive of the invention.

DETAILED DESCRIPTION OF THE INVENTION

Figure 1:
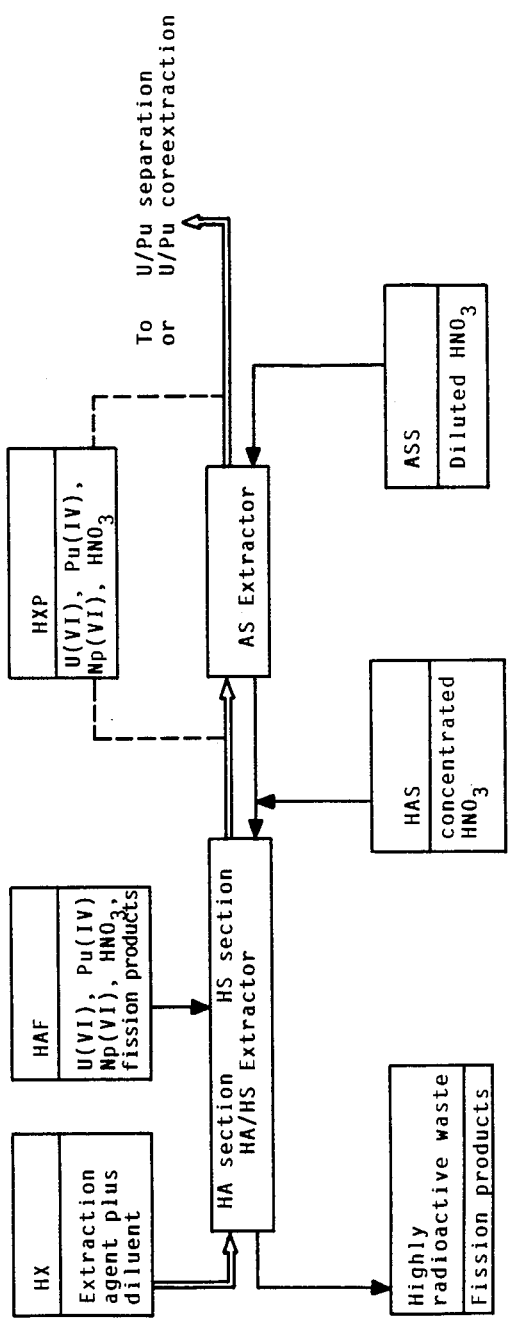
FIG. 1 is a flow chart showing a typical prior art process for the coextraction of uranium and plutonium into an organic phase, and the first and second washing of the resulting charged organic phase without separation of neptunium.

The known flow chart of the coextraction of U and Pu of the Purex process is shown in FIG. 1 and can include a second wash of the organic phase charged with uranium and plutonium. As shown in FIG. 1, a starting aqueous solution HAF, obtained by dissolving irradiated nuclear fuel and/or fertile material in an aqueous strong acid, generally nitric acid, and containing U (VI) ions, Pu (IV) ions, Np (VI) ions, nitric acid, tritium in form of tritiated water and fission products in ionic form, is brought into contact in the HA section of an extractor HA/HS having an extraction section HA and a wash section HS, with an organic phase HX comprised of an organic extraction agent and diluent to form a charged organic phase. The charged organic phase is then subjected to a first washing step with a first wash solution HAS in the form of a rather/concentrated nitric acid solution in the HS section of the HA/HS extractor to bring about a decontamination of fission products from the charged organic phase. After the charged phase in the HS section of the HA/HS extractor has been washed with the concentrated nitric acid solution HAS, it is rewashed in an extractor AS with a second wash solution ASS in the form of a diluted or weak acid wash for the purpose of an improved decontamination of fission products. The weak acid wash solution is then conducted out of the AS extractor into the HS section of the HA/HS extractor where it participates in the first wash of the charged organic phase.

In accordance with the present invention, the second wash of the charged organic phase can be used for the separation of neptunium, however, under two conditions: the acid concentration in the aqueous wash stream of the second wash is kept at a value advantageous for the reduction of neptunium (VI) and the second wash is uncoupled from the first wash, so that the aqueous wash stream of the second wash is fed out of the AS extractor, not into the HA/HS extractor, but rather after a back wash with a fresh extraction agent solution (such as a TBP solution), to waste.

Figure 2:
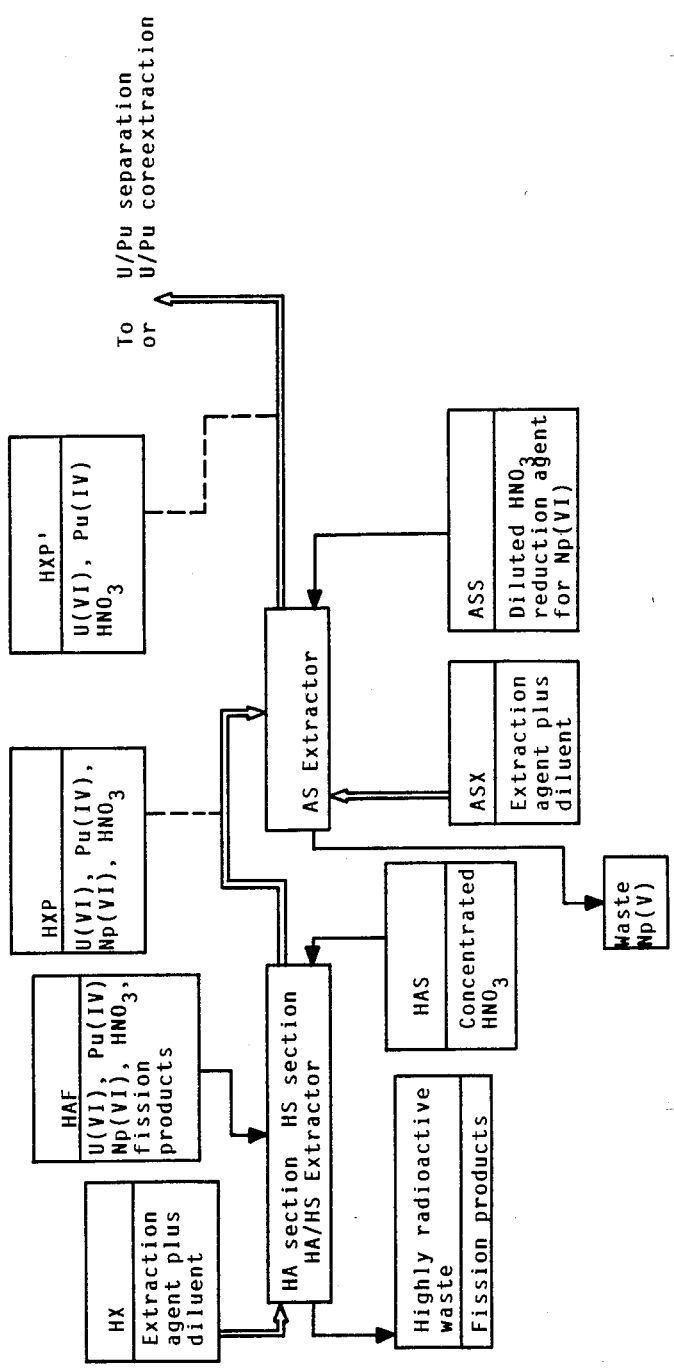
FIG. 2 is a flow chart showing one embodiment of the process of the present invention in which there is a wash of the charged organic phase with separation of neptunium.

FIG. 2 gives a schematic depiction of the process according to the present invention, with the coextraction of uranium and plutonium in the Purex process.

A comparison of FIGS. 1 and 2 then makes clear the difference between the flow chart according to the present invention and the flow chart according to the state of the art. According to the conventional flow chart shown in FIG. 1, the neptunium (V) in the AS extractor which was washed out of the organic phase in the AS extractor at a low acid concentration reaches the HA section of the HA/HS extractor, where it is partially disproportionated by the higher acid concentration present there in the aqueous phase. The valence states (IV) and (VI) of neptunium developed thereby are then further extracted. Also, the decontamination effect of the second wash could be destroyed by the conventional flow chart of FIG. 1. Thus, the fission products which are back extracted in the AS extractor through the weaker acid ASS could be again transformed into the organic phase in the HA/HS extractor at the higher acid concentration. This could lead to an accumulation of neptunium and fission products in the HA/HS/AS chain.

The process according to the present invention, that is illustrated by the Purex process flow chart of FIG. 2, is more complicated than the previous flow chart of FIG. 1, but shows important advantages. Thus, the present invention makes possible, as is shown in the example below, an effective separation of an important portion of neptunium, even before the uranium-plutonium separation and before the cleaning of both products, by means of which a lower decontamination factor ($<5$) suffices for later achieving the required purity. Moreover, in case a tritium-free solution of nitric acid is used for the second washing in the present invention, the washing operation serves also to remove tritium from the organic phase charged with uranium and plutonium. In addition, in the process of the present invention, the organic phase is additionally cleansed of fission products such as zirconium, that are weakly extractable at low acid concentration, and thereby the fission products washed out are directly fed into the waste. Further, in the process of the present invention, the neptunium- and if applicable, tritium-containing aqueous wash solution escaping from the second washing treatment (that is, the aqueous wash solution escaping from the AS extractor) can be preserved separately from the raffinate stream resulting from the HA/HS extractor. Thus, in the present invention, the reduction agent for neptunium (VI) does not come into contact with the greater part of the fission products separated in the HA/HS extractor from uranium and plutonium, and possible redox or precipitation reactions of the reduction agent or its oxidation products with metal ions is avoided.

Still another advantage of the process of the present invention is that the process does not need to be interrupted in the event of a possible breakthrough of plutonium into the neptunium-containing aqueous solution escaping from the AS-extractor.

In the practice of the present invention, the original or starting aqueous solution HAF is obtained by a conventional method, i.e., by dissolving the nuclear fuel element in hot nitric acid, removing solid matter, and adjusting metal and acid concentrations. The concentration of nitric acid in the original solution HAF should amount to 2 to 3.5 mole/liter, preferably 3.0 mole/liter, and that of uranium (VI) to 150 to 300 gram/liter, preferably 240 gram/liter. The plutonium (IV) concentration is given through the burn up of the fuel. This starting solution HAF is sent to the HA/HS extractor according to the flow chart depicted in FIG. 2. Suitable extractors for the HA/HS extractor include a mixer-settler with 3 to 24 steps; a pulsed column with perforated plates or packing, a non-pulsed, stirred column, such as an Oldshue-Rishton-Column etc., each column 1 to 8 m high; a multiple stepped centrifugal extractor or a battery of single stepped centrifugal extractors in series, etc. The relative flow of the starting solution HAF is defined as 1 for the comparison with the flows of other solutions.

The starting solution HAF is contacted with the organic phase, HX, in counter current flow in the HA/HS extractor. The organic phase HX generally comprises an extraction agent and a diluent. The extraction agent is an organic compound, which preferably contains a phosphoryl group and no hydrogen atoms capable of dissociation in its molecule. Accordingly, a phosphoric acid triester, phosphonic acid diester, phosphinic acid ester or a phosphine oxide preferably can be used, i.e., a compound of the type $(RO)_{3-n}R_nPO$, wherein n=0 to 3, R is an alkyl-, aryl-, alkylaryl- or arylalkyl group, and the R-groups are similar or different. Tributylphosphate (TBP) is a preferred extraction agent. The concentration of the extraction agent preferably should be in the range of 0.2 to 1.5 mole/liter, more preferably at 1.1 mole/liter and is selected so that the viscosity of the organic phase HX and its relative density are advantageous, both for the separation of the fluid phases after the contact in the extractor and for charging with uranium, and so that the distribution coefficients of single components are acceptable for all extraction operations carried out during the process.

The diluent can be an individual aliphatic hydrocarbon, from pentane to a high hydrocarbon with a melting point of $>10°$ C.; an individual alicyclic hydrocarbon with or without a sidechain; a halogenated alkane, as, for example, tetrachloromethane, or a compound of the type $C_nF_{2n+2}$ with n $>5$ etc. In all cases, the molecule of the diluent can contain a branched or an unbranched chain. Moreover, a mixture of hydrocarbons can be used, for example, kerosene, which contains aliphatic hydrocarbons and also alicyclic or aromatic hydrocarbons in addition.

The organic phase HX is fed into the HA/HS extractor according to the flow chart given in FIG. 2 with a relative flow of 2 to 4. The flow of the organic phase HX should be arranged such that its charge, after leaving the HA/HS extractor is between 60 and 80%, preferably at 70% of the entire capacity of the extraction agent.

The organic phase charged with uranium and plutonium is washed in the wash section HS of the HA/HS extractor with the first wash solution HAS, which contains 2 to 4 moles of nitric acid/liter, preferably 3 mole/liter, to remove a portion of the fission products from the charged organic phase. The charged and washed organic phase leaves the HA/HS extractor as the HXP stream, in which the uranium and plutonium are already substantially liberated from fission products. Directly after discharge from the HA/HS extractor, the HXP stream is fed to the middle of the AS extractor. There, is contacts the second wash solution in reverse stream (countercurrent flow), which contains nitric acid, the means of reduction for neptunium (VI) and a nitrous acid decomposition agent. Butylaldehyde is used as a means of reduction for neptunium (VI), and indeed preferably is used at a concentration of 0.2 to 0.3 mole/liter in the ASS stream, more preferably 0.25 mole/liter. The nitrous acid, which is formed in the system in small amounts through radiolysis and other reactions and which disturbs the reduction of neptunium (VI) to neptunium (V), is decomposed with sulfamic acid having a concentration in the ASS stream of preferably 0.002 to 0.006 mole/liter, and more preferably 0.004 mole/liter. The nitric acid concentration in the ASS stream preferably should be in the range of 0.5 to 1.2 mole/liter and more preferably be 0.8 mole/liter (in the conventional art the nitric acid concentration in the second wash is about 1.5 mole/liter). The relative flow of the ASS solution preferably should be 0.45 to 0.55, more preferably 0.50.

With contact of the HXP and ASS solutions in the right section of the AS extractor, the neptunium (VI) is reduced to neptunium (V) and transferred into the aqueous ASS solution, together with a portion of the fission products not removed in the HA/HS extractor. Simultaneously, certain amounts of uranium and plutonium are also transferred into the ASS solution, which are again extracted from the ASS solution into an organic extraction solution ASX. For that, the ASX solution, which has the same composition as the HX solution, is contacted with the ASS solution in countercurrent flow in the left section of the AS extractor. The relative flow of the ASX solution preferably should be in the range of 0.3 to 0.6, and more preferably be 0.4. After leaving the AS extractor, the ASS solution is sent either to the high active or, more usually, to the middle active waste. AFter leaVing the AS extractor, the organic solution HXP', now purified from neptunium, is lead further to either the uranium-plutonium separation (the so called "early splitting") or to the coreextraction of uranium and plutonium (the so called "late splitting").

The following example is given by way of illustration to further explain the principles of the invention. This example is merely illustrative and is not to be understood as limiting the scope and underlying principles of the invention in any way. All percentages referred to herein are by weight unless otherwise indicated.

EXAMPLE

A simulated HAF starting solution, which contained 245 gram U (VI)/liter, 4.4 gram Pu (IV)/liter, 190 mg Np (VI)/liter and 2.9 mole nitric acid/liter, was fed into the eighth step of a 16 step laboratory mixer-settler functioning as the HA/HS extractor. The flow of this solution was 150 ml/h. For confirmation of the effectiveness of the separation of neptunium, the neptunium was marked with the isotope $^{238}$Np, the gamma radioactivity of which was measured with a sodium iodide crystal in the energy range of 0.9 to 1.1 MeV. In the first step of the mixer-settler, a 30 volume percentage solution of tributylphosphate in a mixture of n-alkanes ($C_{10}$ to $C_{13}$) was fed in as the organic phase, HX. The flow of the organic phase HX amounted to 400 ml/h. In the sixteenth step of the mixer-settler, a wash solution HAS was fed in which contained 3.0 mole nitric acid/liter and had a flow of 40 ml/h. A charged organic phase HXP left the HA/HS extractor in the sixteenth step and contained 86 gram U (VI)/liter, 1.54 gram Pu(IV)/liter, approximately 60 mg Np (VI)/liter and 0.23 mole nitric acid/liter. The flow of the organic phase HXP was raised through the absorption of U (VI) to approximately 415 ml/h. It was fed into the eighth step of a further 16 step laboratory mixer-settler functioning as the AS extractor.

An ASS solution was fed into the sixteenth step of this AS extractor. The ASS solution contained 0.2 mole butyraldehyde/liter, 0.004 mole sulfamic acid/liter and 0,45 mole nitric acid/liter, with a flow of 90 ml/h. An organic solution ASX, which had the same composition as the HX solution and had a flow of 60 ml/h was sent to the first step of the AS extractor.

The efficiency of the separation of neptunium was characterized with the decontamination factor (DF), which was defined as the relationship of the entire amount of neptunium in the HXP stream entering the AS extractor in a unit of time to the entire amount of neptunium in the HXP' stream exiting the AS extractor in the same unit of time. The DF value varied during the time of the experiment between 100 and 360. A DF of approximately 200 can be given as a typical value, which corresponds to a 99.5 percentage removal of neptunium from the HXP stream. The loss of plutonium in the ASS stream was approximately 0.4%, while the loss of uranium was negligible (<0.1%).

A certain accumulation of plutonium in the aqueous phase between the eighth and the sixteenth step of the AS extractor was observed, but the plutonium concentration could be held under 3 gram/liter in the named area of the AS extractor. Through the adjustment of the uranium concentration in the HXP stream (for example down to 75 gram/liter) and the acid concentration in the ASS stream (for example up to 0.55 mole/liter) to suitable values, the plutonium concentration in the eighth to sixteenth step of the AS extractor can be held under 3 gram/liter also at >5 gram Pu/liter being present in the HAF starting solution.

It will be understood that the above description of the present invention is susceptible to various modifications, changes and adaptations, and the same are intended to be comprehended within the meaning and range of equivalents of the appended claims.

What is claimed is:

1. Process for separating neptunium from an organic phase, which is developed in the recovery of irradiated nuclear fuel and/or fertile material, the organic phase being developed by dissolving the irradiated nuclear fuel and/or fertile material in an aqueous, strong acid to form an aqueous phase containing uranium-, plutonium- and neptunium ions, as well as tritium in form of tritiated water and of fission products in ionic form, and then transferring the uranium-, plutonium- and neptunium ions, as well as portions of the tritium in form of tritiated water and fission products in ionic form from the aqueous phase into an organic phase comprised of an extraction agent dissolved in a diluent, the organic phase then being subjected to a first wash step and a second wash step, the wash steps being decontamination steps, respectively, with respect to fission products, comprising: treating the organic phase, charged predominantly with uranium (VI), plutonium (IV) and neptunium (VI) before the organic phase is further fed to a uranium-plutonium separation or to a uranium-plutonium coextraction by:

(a) bringing the organic phase, after the first wash step, into contact with an aqueous reduction and stripping solution containing diluted HNO3 being free of tritiated water, butyraldehyde and a low concentration of sulfamic acid in countercurrent flow as the second wash step for selectively reducing Np (VI) to Np (V) and for selectively stripping Np (V) with respect to U and Pu, from the organic phase into an aqueous phase;

(b) bringing the aqueous phase resulting from (a), which is charged with Np (V) and with portions of tritium and fission products, into contact with a solution of fresh extraction agent solution having a flow which corresponds to from 1/13.3 to 1/3.3 of the flow of the organic phase coming out from the first wash step and to be contaminated, to assure the selectivity of the stripping of Np (V) with respect to U and Pu; and (c) separating the aqueous phase resulting from step (b) containing Np (V), tritium and fission products from the solution of fresh extraction agent employed in step (b), and staying uncoupled from the first wash.

2. Process according to claim 1, wherein the aqueous reduction and stripping solution has a concentration of butyraldehyde of 0.2 to 0.3 mole/liter, a concentration of sulfamic acid of 0.002 to 0.006 mole/liter, and a HNO3 concentration of 0.5 to 1.2 mole/liter.

3. Process according to claim 1, wherein the relative flows of the organic solution coming out from the first wash step and being charged with U (VI), Pu (IV) and Np (VI), to the aqueous reduction and stripping solution containing butyraldehyde to the fresh organic extracting-agent solution amounts to 1.0:0:11 to 0:275:0.075 to 0.3.

4. Process according to claim 2, wherein the relative flows of the organic solution charged with U (VI), Pu (IV) and Np (VI), to the aqueous reduction and stripping solution containing butyraldehyde to the fresh organic extracting-agent solution amounts to 1.0:0.11 to 0.275:0.075 to 0.3.

5. Process according to claim 1, wherein the separated aqueous phase obtained in step (c) is sent directly to waste.

6. Process for separating neptunium from an organic phase, which is developed in the recovery of irradiated nuclear fuel and/or fertile material, the organic phase being developed by dissolving the irradiated nuclear fuel and/or fertile material in an aqueous, strong acid to form an aqueous phase containing uranium-, plutonium- and neptunium ions, as well as tritium in form of tritiated water and of fission products in ionic form, and then transferring the uranium-, plutonium- and neptunium ions, as well as portions of the tritium in form of tritiated water and fission products in ionic form from the aqueous phase into an organic phase comprised of an extraction agent dissolved in a diluent, the organic phase then being subjected to a first wash step and a second wash step, the wash steps being decontaminating steps, respectively, with respect to fission products, comprising: treating the organic phase, charged predominantly with uranium (VI), plutonium (IV) and neptunium (VI) before the organic phase is further fed to a uranium-plutonium separation or to a uranium-plutonium coextraction by:

(a) bringing the organic phase, after the first wash step, into contact with an aqueous reduction and stripping solution containing diluted HNO3, butyraldehyde and a low concentration of sulfamic acid in countercurrent flow as the second wash step for selectively reducing Np (VI) to Np (V) and for selectively stripping Np (V) with respect to U and Pu, from the organic phase into an aqueous phase;

(b) bringing the aqueous phase resulting from (a), which is charged with Np (V) into contact with a solution of fresh extraction agent solution having a flow which corresponds to from 1/13.3 to 1/3.3 of the flow of the organic phase coming out from the first step and to be decontaminated, to assure the selectivity of the stripping of Np (V) with respect to U and Pu; and (c) separating the aqueous phase resulting from step (b) containing Np (V) from the solution of fresh extraction agent employed in step (b), and staying uncoupled from the first wash.

7. Process according to claim 1, wherein the organic extraction agent contains a phosphoryl group and no hydrogen atoms capable of dissociation in its molecule.

8. Process according to claim 1, wherein the organic extraction agent is a phosphoric acid triester, a phosphoric acid diester, a phosphonic acid ester or a phosphine oxide.

9. Process according to claim 1, wherein the organic extraction agent is a compound of the formula $(RO)_{3-n}R_nPO$, where $n=0$ to 3, and R is an alkyl group, an aryl group, an alkylaryl group, or an arylalkyl group, and the R groups are the same or are different from each other.

10. Process according to claim 6, wherein the organic extraction agent contains a phosphoryl group and no hydrogen atoms capable of dissociation in its molecule.

11. Process according to claim 6, wherein the organic extraction agent is a phosphoric acid treester, a phosphoric acid diester, a phosphonic acid ester or a phosphine oxide.

12. Process according to claim 6, wherein the organic extraction agent is a compound of the formula $(RO)_{3-n}R_nPO$, where $n=0$ to 3, and R is an alkyl group, an aryl group, an alkylaryl group, or an arylalkyl group, and the R groups are the same or are different from each other.

13. Process according to claim 6, wherein the aqueous reduction and stripping solution has a concentration of butyraldehyde of 0.2 to 0.3 mole/liter, a concentration of sulfamic acid of 0.002 to 0.006 mole/liter, and a HNO3 concentration of 0.5 to 1.2 mole/liter.

14. Process according to claim 6, wherein the relative flows of the organic solution coming out from the first wash step and being charged with U (VI), Pu (IV) and Np (VI), to the aqueous reduction and stripping solution containing butyraldehyde to the fresh organic extracting-agent solution, amounts to 1.0:0.11 to 0.275:0.075 to 0.3.

15. Process according to claim 6, wherein the relative flows of the organic solution charged with U (VI), Pu (IV) and Np (VI), to the aqueous reduction and stripping solution containing butyraldehyde to the fresh organic extracting-agent solution amounts to 1.0:0.11 to 0.275:0.075 to 0.3.

16. Process according to claim 6, wherein the separated aqueous phase obtained in step (c) is sent directly to waste.

* * * * *